MULTIPLIER FOR BINARY OCTAL CODED NUMBERS

Filed April 14, 1964 6 Sheets-Sheet 1

INVENTOR:
ANDREW T. LING
BY Samuel Cohen
Attorney

INVENTOR.
ANDREW T. LING
BY Samuel Cohen
Attorney

MULTIPLIER FOR BINARY OCTAL CODED NUMBERS

Filed April 14, 1964 6 Sheets-Sheet 3

INVENTOR.
ANDREW T. LING
BY Samuel Cohen
ATTORNEY

Jan. 24, 1967 A. TE-AN LING 3,300,626

MULTIPLIER FOR BINARY OCTAL CODED NUMBERS

Filed April 14, 1964 6 Sheets-Sheet 4

INVENTOR.
ANDREW T. LING
BY Samuel Cohen
Attorney

INVENTOR.
ANDREW T. LING
BY Samuel Cohen
Attorney

INVENTOR.
ANDREW T. LING

BY [signature]

Attorney

United States Patent Office 3,300,626
Patented Jan. 24, 1967

3,300,626
MULTIPLIER FOR BINARY OCTAL CODED NUMBERS

Andrew Te-an Ling, Collingswood, N.J., assignor to Radio Corporation of America, a corporation of Delaware Filed Apr. 14, 1964, Ser. No. 359,718
3 Claims. (Cl. 235—156)

This invention relates to a new and improved multiplication system which is especially suitable for use in a high speed data processing system.

The classical algorithm for multiplication of two operands, that is, multiplication of a multiplicand and a multiplier, is to repeat add-shift cycles for each bit of the multiplier. The time required is relatively long. In higher speed methods of multiplication, the number of add-shift cycles required is reduced by processing a group of bits of the multiplier at a time. However, these higher speed methods require multiples of the multiplicand to be generated and stored for later use, as called for by the different values of the groups of bits of the multiplier. As the number of bits in a group increases, the number of stored multiples increases correspondingly, and this often renders these higher speed methods so costly to implement that they become impractical.

In the system of the present invention, only three multiples of the multiplicand are stored, even though there are a relatively large number of bits or digits of the multiplier handled at a time. More specifically, the 1, 7 and $21_{10}$ multiples of the multiplicand are initially generated and stored. The generation of the 7 multiple may be accomplished by shifting the multiplicand one binary place to the left to obtain its 2 multiple, shifting the multiplicand two binary places to the left to obtain its 4 multiple, and adding the 4, 2 and 1 multiples. In a similar manner, the $21_{10}$ multiple is obtained by shifting the 7 multiple one binary place to the left to obtain the $14_{10}$ multiple and adding the $14_{10}$ multiple to the 7 multiple. The product of the multiplier and multiplicand is obtained by adding successive partial products of the multiplier bits (taken 6 at a time) and the multiplicand. The partial products are produced by employing the 1, 7 and $21_{10}$ multiples of the multiplicand and the complements of these 1, 7 and $21_{10}$ multiples in accordance with algorithms discussed in detail below.

An important advantage of the multiplier of the invention is its very high speed. The 1 and 7 multiples of the multiplicand are concurrently obtained in one adder cycle. The $21_{10}$ multiple is obtained in one additional adder cycle. Each partial product is obtained in approximately one adder cycle. Accordingly, it is possible to multiply two 48 bit words, for example, in approximately $1+1+8=10$ adder cycles of which the initial two adder cycles may be overlapping with the multiplier access time. This is 3 to 6 times faster than the multiplication time for other, more conventional systems.

The invention is discussed in greater detail below and is illustrated in the following drawings of which:

FIGURE 1 is a block circuit diagram of the multiplier of the invention;

FIGURES 2*a* and 2*b* are drawings of a gate and flip-flop, respectively, which show the conventions employed in the drawings;

Figure 1:
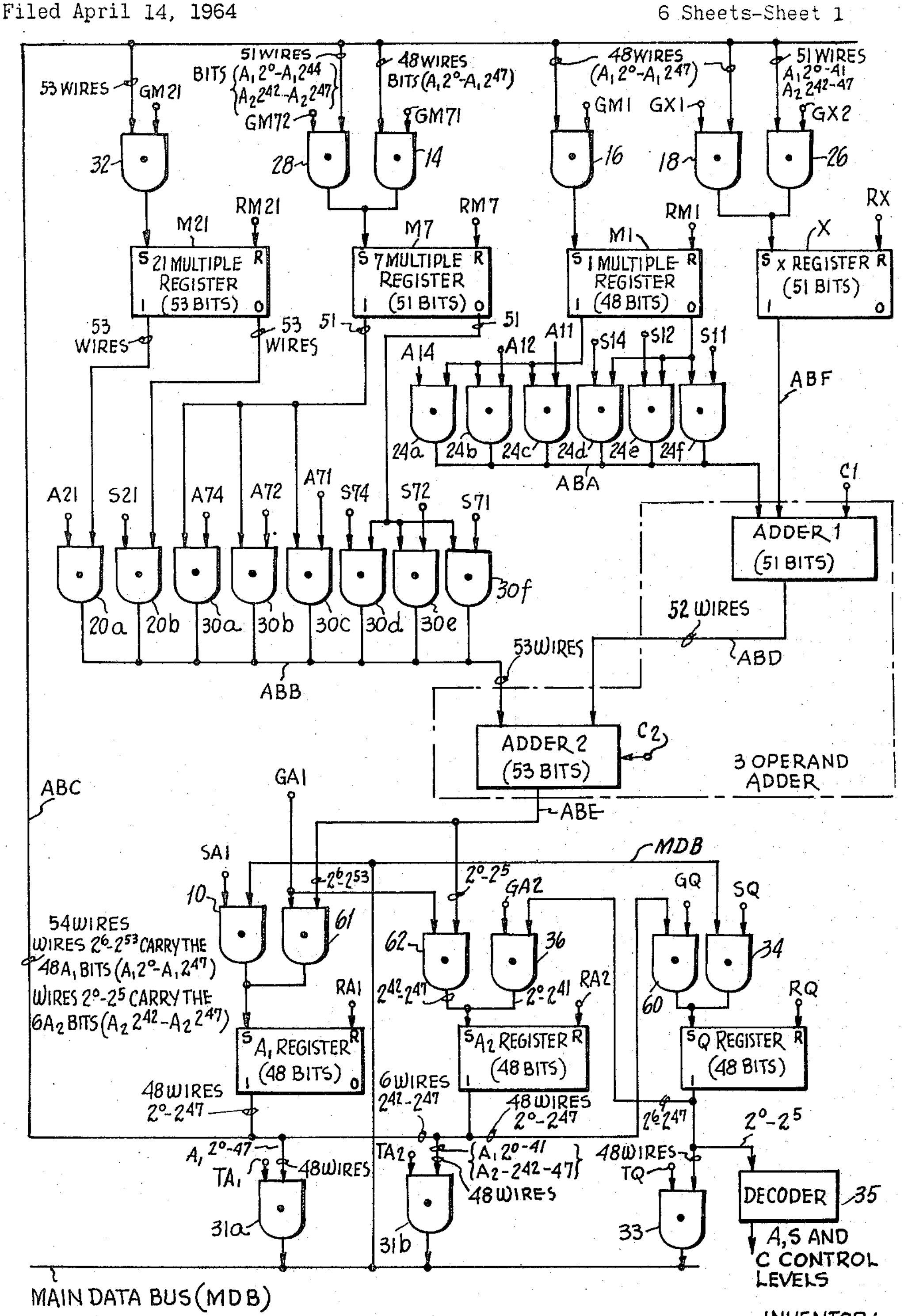

In the example of the invention chosen for illustration, a 48 bit multiplicand is multiplied by a 48 bit multiplier. Each 48 bits may be considered to comprise 16, 3-bit octal characters. However, in the introductory portion of the explanation, it is convenient to consider each 6 bits as representing a number to the base 10, and it is also convenient to discuss the obtaining of base 10 multiples of the multiplicand. In any case in which there is a possibility of confusion, the subscript indicating the base of a particular number is given.

For the purpose of drawing simplicity, single lines are used to represent multiple wire buses. For example, in FIGURE 1 the line ABB represents a 53 wire bus. (In a number of cases, a circle around the wire and a number indicate the actual number of wires in the bus.) For the same reason single blocks are employed in the drawings to represent several stages. For example, the block M7 represents a register which comprises 51 stages (51 flip-flops). The single lead going to the S or set terminal of the register represents multiple leads going to the set terminals of the different stages, respectively. A block such as 32 represents a plurality of AND gates, one for each wire of the incoming bus.

Throughout the discussion, binary digits (bits) are referred to. It is to be understood that, in practice, these bits are manifested by electrical signals. A bit of a particular significance is referred to by the numeral 2 raised to an appropriate power. For example, the $2^0$ bit refers to the least significant bit of a binary word. In a similar manner, the flip-flop stages making up registers are also referred to by 2 raised to a particular power.

Figure 2A:
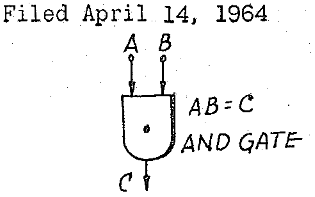
Figure 2B:
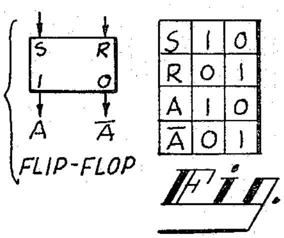

The conventions employed in various of the figures are given in FIGURE 2. The Boolean equation defines the operation of the AND gate of FIGURE 2*a* and the truth table explains the operation of the flip-flop of FIGURE 2*b*. It is to be understood that these conventions are purely arbitrary. Further, the invention is not limited to the use of AND gates but can employ, for example, NAND, NOR, or other logic gates instead.

The multiplication of two binary words is controlled by various direct current levels, some of which are concurrent and some of which occur in a certain order. These direct current levels may be generated in the control area of the computer. For example, the G levels (such as GA1, GQ and so on); the S levels (such as SA1 and SQ); and the R levels (such as RM1, RA1 and so on) are all so generated under the control of wired-in "hardware" or under the control of instructions of a program stored in the memory. Other direct current levels are produced by the decoder 35 of FIGURE 1. Examples here are the various A, S and C levels.

In the multiplication system of FIGURE 1, there are accumulator registers A and Q which normally hold the arithmetic results. The A register comprises $A_1$ and $A_2$ registers, which together are addressed by the program as the A register.

The main data bus MDB carries bits to and from the memory (not shown) of the data processing system. The word from the main bus may be applied through gates 10 (lower left of figure) to the 48-stage $A_1$ register and through gates 34 (lower right of figure) to the 48-stage Q register. Initially, the word stored in the $A_1$ register is the multiplicand. However, during the multiplication process, the $A_1$ register stores a portion of the word produced by adder 2 as is discussed in more detail later. The $A_2$ register, which also has 48 stages, has a number of purposes, among them to store a portion of the output word of adder 2, as is also discussed in more detail later.

The system of FIGURE 1 also includes a 53-stage register M21; a 51-stage register M7; a 48-stage register M1; and a 51-stage register X. The M21, M7 and M1 registers are for the purpose of storing the $21_{10}$, 7 and 1 multiples of the multiplicand. The X register is a partial product register and is also employed during the generation of the $21_{10}$, 7 and 1 multiples.

Gates 32 are input gates for the M21 register. Gates 28 and 14 are input gates for the M7 register. Gates 16 are input gates for the M1 register. Gates 18 and 26 are input gates for the X register. Gates 20*a* and 20*b* are output gates for the M21 register. Gates 30*a*–30*f* are output gates of the M7 register and gates 24*a*–24*f* are output gates of the M1 register..

The gates 31*a* and 31*b* connect the adder bus ABC to the main data bus MDB. The gate 33 connects the Q register to the main data bus MDB. The decoder 35 is connected to the stages of the Q register storing the least significant 6 bits. This decoder produces various A, S and C control levels for controlling the operation of the multiplier, as discussed in more detail shortly.

The system of FIGURE 1 also includes a three-operand adder circuit. Specifically, and for convenience, this three-operand adder logic is implemented by cascading two two-operand adders (adder 1 and adder 2) to each other. Any of a number of well-known two-operand adders may be used. Or, a true three-operand adder circuit can substitute for the two adders shown.

In the operation of the system of FIGURE 1, it is first necessary to generate the 1, 7 and $21_{10}$ multiples of the multiplicand. After (or during) the time these multiples are obtained and stored in the M1, M7 and M21 registers, respectively, the multiplier word is transferred from the main data bus into the Q register. (In general, the generation of multiples occurs during the transfer of the multiplier into the Q register because of the time interval required to obtain access to the memory. Thus, little time is lost. Nevertheless, in the detailed explanation, to avoid confusion, concurrent operations of this type are sometimes discussed as if they occur in time sequence.) Thereafter, a partial product is obtained of the least significant 6 bits of the multiplier word and the multiplicand by employing the algorithms shown in Table I below. The process is repeated until the entire product is obtained.

With two exceptions, any partial product in Table I is obtained in one adder cycle. The $31_{10}$ and $33_{10}$ partial products of the multiplicand each require two adder cycles, as is discussed in more detail later. This is indicated by an asterisk which appears next to 31 and 33. The notations in the algorithm column are in shorthand form. Thus 14+2 means $14_{10}$ times the multiplicand plus 2 times the multiplicand. *C*—21+2 means $64_{10}$ times the multiplicand minus $21_{10}$ times the multiplicand plus 2 times the multiplicand. It should be clear from this discussion that C in the table refers to a carry, that is, $64_{10}$ or $100_8$ or $1000000_2$, which must be added to the next 6-bit multiplier. $C_1$ and $C_2$ are carries which are applied to adders 1 and 2 respectively. These three carry control levels are generated in the decoder 35. (There is also a fourth carry C′ control level generated in response to an overflow of the first six stages of register $A_2$. This is discussed later in connection with FIGURE 5.)

TABLE I

| Multiplier | | | | Levels (X Indicates level is present) | | | | | | | | | | | | | | | | |
|---|---|---|---|---|---|---|---|---|---|---|---|---|---|---|---|---|---|---|---|---|
| Decimal | Octal | Actual Binary | Algorithm in Decimal Form | A211 | S211 | A74 | A72 | A71 | S74 | S72 | S71 | A14 | A12 | A11 | S14 | S12 | S11 | C | $C_1$ | $C_2$ |
| 0 | 0 | 000000 | 0 | | | | | | | | | | | | | | | | | |
| 1 | 1 | 000001 | 1 | | | | | | | | | | | X | | | | | | |
| 2 | 2 | 000010 | 2 | | | | | | | | | | X | | | | | | | |
| 3 | 3 | 000011 | 7-4 | | | | | X | | | | | | | X | | | | X | |
| 4 | 4 | 000100 | 4 | | | | | | | | | X | | | | | | | | |
| 5 | 5 | 000101 | 7-2 | | | | | X | | | | | | | | X | | | X | |
| 6 | 6 | 000110 | 7-1 | | | | | X | | | | | | | | | X | | X | |
| 7 | 7 | 000111 | 7 | | | | | X | | | | | | | | | | | | |
| 8 | 10 | 001000 | 7+1 | | | | | X | | | | | | X | | | | | | |
| 9 | 11 | 001001 | 7+2 | | | | | X | | | | | X | | | | | | | |
| 10 | 12 | 001010 | 14−4 | | | | X | | | | | | | | X | | | | X | |
| 11 | 13 | 001011 | 7+4 | | | | | X | | | | X | | | | | | | | |
| 12 | 14 | 001100 | 14−2 | | | | X | | | | | | | | | X | | | X | |
| 13 | 15 | 001101 | 14−1 | | | | X | | | | | | | | | | X | | X | |
| 14 | 16 | 001100 | 14 | | | | X | | | | | | | | | | | | | |
| 15 | 17 | 001111 | 14+1 | | | | X | | | | | | | X | | | | | | |
| 16 | 20 | 010000 | 14+2 | | | | X | | | | | | X | | | | | | | |
| 17 | 21 | 010001 | 21−4 | X | | | | | | | | | | | X | | | | X | |
| 18 | 22 | 010010 | 14+4 | | | | X | | | | | X | | | | | | | | |
| 19 | 23 | 010011 | 21−2 | X | | | | | | | | | | | | X | | | X | |
| 20 | 24 | 010100 | 21−1 | X | | | | | | | | | | | | | X | | X | |
| 21 | 25 | 010101 | 21 | X | | | | | | | | | | | | | | | | |
| 22 | 26 | 010110 | 21+1 | X | | | | | | | | | | X | | | | | | |
| 23 | 27 | 010111 | 21+2 | X | | | | | | | | | X | | | | | | | |
| 24 | 30 | 011000 | 28−4 | | | X | | | | | | | | | X | | | | X | |
| 25 | 31 | 011001 | 21+4 | X | | | | | | | | X | | | | | | | | |
| 26 | 32 | 011010 | 28−2 | | | X | | | | | | | | | | X | | | X | |
| 27 | 33 | 011011 | 28−1 | | | X | | | | | | | | | | | X | | X | |
| 28 | 34 | 011100 | 28 | | | X | | | | | | | | | | | | | | |
| 29 | 35 | 011101 | 28+1 | | | X | | | | | | | | X | | | | | | |
| 30 | 36 | 011110 | 28+2 | | | X | | | | | | | X | | | | | | | |
| *31 | 37 | 011111 | 28+2+1 | | | X | | | | | | | X | X | | | | | | |
| 32 | 40 | 100000 | 28+4 | | | X | | | | | | X | | | | | | | | |
| *33 | 41 | 100001 | C−28−2−1 | | | | | | X | | | | | | | X | X | X | X | X |
| 34 | 42 | 100010 | C−28−2 | | | | | | X | | | | | | | X | | X | X | X |
| 35 | 43 | 100011 | C−28−1 | | | | | | X | | | | | | | | X | X | X | X |
| 36 | 44 | 100100 | C−28 | | | | | | X | | | | | | | | | X | | X |
| 37 | 45 | 100101 | C−28+1 | | | | | | X | | | | | X | | | | X | | X |
| 38 | 46 | 100110 | C−28+2 | | | | | | X | | | | X | | | | | X | | X |
| 39 | 47 | 100111 | C−21−4 | | X | | | | | | | | | | X | | | X | X | X |

TABLE I—Continued

| Multiplier | | | | Levels (X Indicates level is present) | | | | | | | | | | | | | | | | |
|---|---|---|---|---|---|---|---|---|---|---|---|---|---|---|---|---|---|---|---|---|
| Decimal | Octal | Actual Binary | Algorithm in Decimal Form | A211 | S211 | A74 | A72 | A71 | S74 | S72 | S71 | A14 | A12 | A11 | S14 | S12 | S11 | C | $C_1$ | $C_2$ |
| 40 | 50 | 101000 | C−28+4 | | | | | | X | | | X | | | | | | X | | X |
| 41 | 51 | 101001 | C−21−2 | | X | | | | | | | | | | | X | | X | X | X |
| 42 | 52 | 101010 | C−21−1 | | X | | | | | | | | | | | | X | X | X | X |
| 43 | 53 | 101011 | C−21 | | X | | | | | | | | | | | | | X | | X |
| 44 | 54 | 101100 | C−21+1 | | X | | | | | | | | | X | | | | X | | X |
| 45 | 55 | 101101 | C−21+2 | | X | | | | | | | | X | | | | | X | | X |
| 46 | 56 | 101110 | C−14−4 | | | | | | | X | | | | | X | | | X | X | X |
| 47 | 57 | 101111 | C−21+4 | | X | | | | | | | X | | | | | | X | | X |
| 48 | 60 | 110000 | C−14−2 | | | | | | | X | | | | | | X | | X | X | X |
| 49 | 61 | 110001 | C−14−1 | | | | | | | X | | | | | | | X | X | X | X |
| 50 | 62 | 110010 | C−14 | | | | | | | X | | | | | | | | X | | X |
| 51 | 63 | 110011 | C−14+1 | | | | | | | X | | | | X | | | | X | | X |
| 52 | 64 | 110100 | C−14+2 | | | | | | | X | | | X | | | | | X | | X |
| 53 | 65 | 110101 | C−7−4 | | | | | | | | X | | | | X | | | X | X | X |
| 54 | 66 | 110110 | C−14+4 | | | | | | | X | | X | | | | | | X | | X |
| 55 | 67 | 110111 | C−7−2 | | | | | | | | X | | | | | X | | X | X | X |
| 56 | 70 | 111000 | C−7−1 | | | | | | | | X | | | | | | X | X | X | X |
| 57 | 71 | 111001 | C−7 | | | | | | | | X | | | | | | | X | | X |
| 58 | 72 | 111010 | C−7+1 | | | | | | | | X | | | X | | | | X | | X |
| 59 | 73 | 111011 | C−7+2 | | | | | | | | X | | X | | | | | X | | X |
| 60 | 74 | 111100 | C−4 | | | | | | | | | | | | X | | | X | X | |
| 61 | 75 | 111101 | C−7+4 | | | | | | | | X | X | | | | | | X | | X |
| 62 | 76 | 111110 | C−2 | | | | | | | | | | | | | X | | X | X | |
| 63 | 77 | 111111 | C−1 | | | | | | | | | | | | | | X | X | X | |

Before giving a detailed explanation of the system of FIGURE 1, it may be helpful to show step by step how a specific multiplication problem is solved. This is shown in Table II, which follows. The various columns illustrate the outputs of the X register and the 2 adders, and also the words present on the ABA and ABB busses. The multiplicand assumed is $(1405)_8$ and the multiplier assumed is $(7526)_8$. Two cycles for generating multiples are illustrated. The final product obtained is shown enclosed by a line in the lower right of the table.

Normally, the most significant half of the product is stored at the end in the $2^0$–$2^{47}$ stages of the $A_1$ register, and the least significant half in the $2^0$–$2^{47}$ stages of the Q register.

In the particular example chosen for illustration, the second and final multiplier word (6 bits) causes the decoder 35 to produce a carry. Therefore, one additional add cycle is required to complete the multiplication. This final add cycle does not cause the levels RQ and SQ to be generated to shift the final product. Therefore, in this particular example, the most significant 48 bits of the final product is stored in the $2^0$–$2^{41}$ stages of the $A_1$ register and the $2^{42-47}$ stages of the $A_2$ register.

Gates 31*a*, 31*b* and 33 in FIGURE 1 are used to transfer the final product to the main memory (not shown). In the general case, the complete final product straddles both the $A_1$ and Q registers. Therefore, gates 31*a* are used for the transfer of the most significant portion of the final product. Since the $A_1$ and $A_2$ registers together comprise the A register, as far as the system program is concerned, there will be no confusion as to where the final significant half of the product will be.

In general, it may be assumed that the multiplicand is present in the $A_1$ register by virtue of previous operations. If this is not the case, to start the multiplication process, the $A_1$ register is reset by either RA1 or a general reset (not shown) and the level SA1 is generated to prime gates 10, and the multiplicand word from the memory, assumed for the present to be 48 bits long, is transferred from the main data bus MDB through gates 10 to the $A_1$ register.

Figure 3:
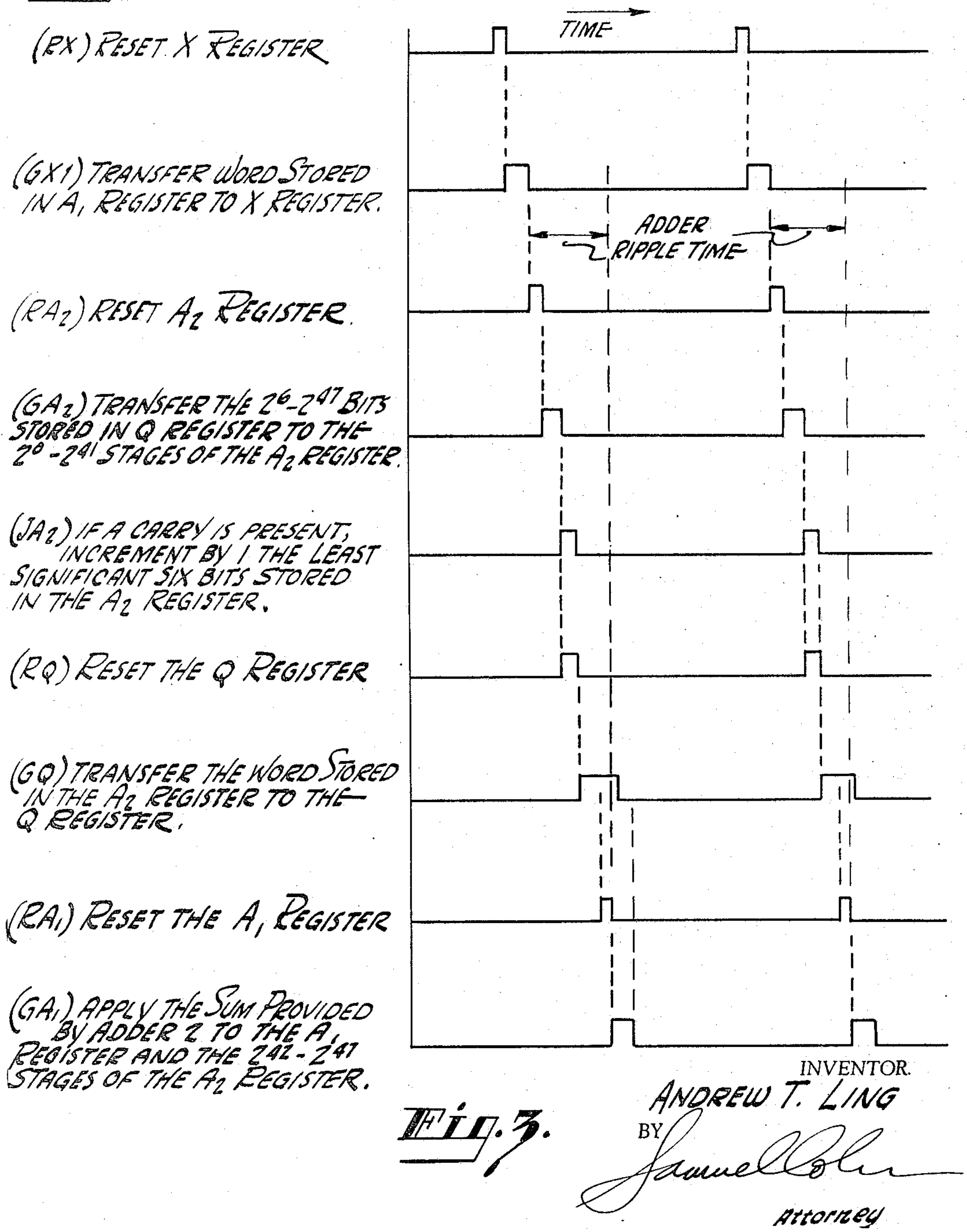
FIGURE 3 is a timing diagram to help explain the operation of the system of FIGURE 1.

Now the generation of the multiples begins. FIGURE 3 shows the sequence of control signals to be generated during the add cycle for the generation of the multiples as well as for the partial product. For simplicity, the control signals are shown to occur in sequence, although in practice some can be concurrent to reduce the time required for each multiplication cycle.

First, levels GM71, GM1 and GX1 are concurrently generated to prime the input AND gates 14, 16 and 18 leading to the M7, M1 and X registers, respectively. This causes the 48-bit word in the $A_1$ register to pass into the M7, M1 and X registers, respectively.

Concurrently with (or after) the generation of the G levels, the computer control system (not shown), independently of the decoder 35, generates the A12 and A74 levels. The signal MG1 applied from the control system to flip-flop A12 of FIGURE 7, for example, causes the A12 level to be generated. A similar circuit (not shown) causes the A74 level to be generated in response to a signal MG2 from the control area. The signals A12 and A74 are applied to the output gates 30*a* and 24*b* of FIGURE 1.

TABLE II

| | X Register | ABA Bus | Adder #1 Output | ABB Bus | Adder #2 Output |
|---|---|---|---|---|---|
| 1st Multiple Generation Cycle | 000 001 100 000 101 | 000 011 000 001 010 | 000 100 100 001 111 | 000 000 110 000 010 100 | 000 001 010 100 100 011 |
| 2nd Multiple Generation Cycle | 001 010 100 100 011 | 000 000 000 000 000 | 001 010 100 100 011 | 000 010 101 001 000 110 | 000 011 111 101 101 001 |
| 1st Partial Product Cycle | 000 000 000 000 000 | 000 011 000 001 010 | 000 011 000 001 010 | 000 011 111 101 101 001 | 000 100 001 001 101 110 |
| 2nd Partial Product Cycle | 000 000 100 001 001 | 000 110 000 010 100 | 000 110 100 011 101 | 111 110 101 011 011 100* | 111 111 011 111 111 010 |
| 3rd Partial† Product Cycle | 111 111 111 011 111 | 000 001 100 000 101 | 000 001 011 100 100 | 000 000 000 000 000 000 | 000 000 001 011 100 100 |

*$C_2$=1.
†Additional cycle required due to carry in last multiplication digit.
Multiplicand (Initially in $A_1$ Register)=001 100 000 101=$(1405)_8$.
Multiplier (Initially in Q Register)=111 101 010 110=$(7526)_8$.
Final Product=001 011 100 100 111 010 101 110=$(13447256)_8$.

The 48-bit word in the M7 register therefore passes through gates 30*a* onto bus ABB; however, the connection is such that the word is shifted two places to the left. In other words, if one assumes a somewhat shorter word, such as 1011, the bits of which are stored in the $2^3, 2^2, 2^1$ and $2^0$ stages of the M7 register, the word appearing on the ABB bus, when gates 30*a* are actuated, is 101100. These bits appear on the $2^5, 2^4, 2^3, 2^2, 2^1$ and $2^0$ wires, respectively, of the ABB bus. The effect of shifting any binary number two places to the left is that of multiplying the number by 4 (in this example, $1011 = 11_{10}$; $101100 = 44_{10}$). Accordingly, the word appearing on bus ABB is the 4 multiple of the word stored in the M7 register, which is at this time the multiplicand.

The priming of gates 24*b* at the output of the M1 register causes a word to appear on the ABA bus which is shifted one place to the left with respect to the word in the M1 register. Shifting a word one place to the left has the effect of multiplying the word by 2. Therefore, the word present on the ABA bus is the 2 multiple of the multiplicand. $C_1$ and $C_2$, the carries applied to adders 1 and 2 respectively, are both zero (0). The adder 1 adds the word stored in the X register, which, it will be recalled, is the multiplicand, to the word on the ABA bus, which is the 2 multiple of the multiplicand. The sum of these two words, which appears on bus ABD, is the 3 multiple of the multiplicand.

The adder 2 adds the word on the ABD bus to the word on the ABB bus. The sum it obtains is the 7 multiple of the multiplicand since the ABB bus carries the 4 multiple and the ABD bus carries the 3 multiple of the multiplicand.

The level GA1 is now applied to gates 61 and 62 to cause the adder 2 output word to pass through gates 61 and 62, respectively, to the $A_1$ register and the $2^{43}$–$2^{47}$ stages of the $A_2$ register. The least significant bit of the sum word is stored in the $2^{42}$ stage of the $A_2$ register, the seventh bit of the sum word is stored in the $2^0$ stage of the $A_1$ reigster, and the most significant bit of the word is stored in the $2^{47}$ stage of the $A_1$ register. (Actually, the 7 multiple of a 48-bit word has only 51 bits so that the three most significant bits in the $A_1$ register, thus is, the bits in the $2^{45}$–$2^{47}$ stages, are zero.)

Summarizing the operation to this point, the multiplicand it initially stored in the $A_1$ register. It is transferred into the M7, M1 and X registers. By means of shifting, the 4 multiple of the multiplicand is produced on the ABB bus and the 2 multiple of the multiplicand is produced on the ABA bus. The adder 1 produces a 3 multiple of the multiplicand on the ABD bus and the adder 2 produces the 7 multiple of the multiplicand on the ABE bus. This 7 multiple is stored in the $A_1$ register and part of the $A_2$ register.

The signals GM72 and GX2 are now generated. These prime AND gates 28 and 26 and cause the 7 multiple of the multiplicand to pass into the M7 and X registers, respectively. The RM1 level is not generated so that the M1 register remains in its set condition and stores the 1 multiple of the multiplicand. The level A72 is now generated to prime AND gate 30*b* and thereby produce the $2 \times 7$ or $14_{10}$ multiple of the multiplicand on bus ABB. None of the gates 24 is primed. Accordingly, the adder 1 produces on its output bus ABD the same word as is stored in the S register, namely the 7 multiple of the multiplicand. The adder 2 adds the $14_{10}$ multiple which appears on bus ABB to the 7 multiple appearing on bus ABD to produce the $21_{10}$ multiple on its output bus ABE.

During the addition, the $A_1$ and $A_2$ registers may be reset by apply the reset signals RA1 and RA2. Upon completion of the addition, the level GA1 is applied to AND gates 61 and 62 to cause the $21_{10}$ multiple of the multiplicand to pass into the $A_1$ and $A_2$ registers. As in the case of the 7 multiple, only the most significant 6 stages of the $A_2$ register are employed. One does not need more than 47+6 or 53 stages to store the 21 multiple, since, in the worst case, the 21 multiple is never longer than 53 bits. After the 21 multiple is stored in the $A_1$ and part of the $A_2$ registers, the level GM21 is applied to gate 32 to cause the 21 multiple to pass into the M21 register.

Summarizing the latter part of thte explanation, the 1 multiple and 7 multiple of the multiplicand are stored in the M1 and M7 registers, respectively. The gates 30*b* obtain the $14_{10}$ multiple and the adder 2 adds the $14_{10}$ multiple to the 7 multiple to produce the $21_{10}$ multiple of the multiplicand on bus ABE. The $21_{10}$ multiple of the multiplicand is transferred into the M21 register. The X register may now be cleared by applying a reset level RX. The $A_1$ and $A_2$ registers may also be cleared by applying the reset signals RA1, RA2 and RQ, respectively.

The multiplier word is now obtained from the memory and placed on the main data bus MDB. The level SQ is generated priming AND gates 34 thereby permitting the multiplier to pass into the Q register. The system is now ready to obtain the product of the multiplicand and the multiplier.

The decoder 35 is connected to the stages (the $2^0$–$2^5$ stages) storing the 6 least significant bits of the multiplier. The purpose of the decoder is to decode these multiplier bits in accordance with the algorithms listed in Table I. As an example, assume that these 6 bits are 010010 representing the decimal number 18 or the octal number 22. The algorithm employed to obtain the $18_{10}$ multiple of the multiplicand is to obtain the $14_{10}$ multiple of the multiplicand and to add it to the 4 multiple of the multiplicand. This operation is carried out in response to the levels A72 and A14 generated by the decoder when the decoder receives the 6 multiplier bits 010010, that is, $14_{10}$.

In the example above, the multiplier word is less than 33. If it is equal to or greater than 33, the decoder 35 generates a carry signal C. This carry signal is applied via lead 69 (FIGURE 5) to the temporary storage flip-flop 71 (shown in FIGURE 5), which stores the carry signal.

During the time the A and/or S levels are generated by the decoder 35 (FIGURE 1), the word stored in the $A_1$ register may be transferred to the X register. This is accomplished by generating the level GX1 to prime AND gates 18 (upper right of FIGURE 1). In the present instance, the $A_1$ register is reset so that during this first cycle of the multiplication the word transferred to the X register is 0.

The level GA2 may also be generated during the time the A and/or S levels are generated thereby priming the AND gates 36. This causes the $2^6$–$2^{47}$ bits (the 42 most significant bits) stored in the Q register to be transferred to the $2^0$–$2^{41}$ (the first 42 stages) of the $A_2$ register.

The first 6 stages (the $2^0$–$2^5$ stages) of the $A_2$ register comprise a 6-stage triggerable flip-flop counter. In the event that the flip-flop 71 (FIGURE 5) is storing a carry, it is necessary to increment by one the next partial multiplier word. (This word, that is, the $2^6$–$2^{11}$ bits of the complete 48-bit multiplier word, is now stored in the first 6 stages of the $A_2$ register as a result of the transfer thereof from the Q register.) It is possible that when the next multiplier word is incremented by one, another carry C′ will result. This carry may be stored in a flip-flop 72, shown in FIGURE 5, which is connected to the sixth (the $2^5$) stage of the $A_2$ register. This carry C′ must be stored so that it may later be used to increment by one, the third partial multiplier word—the $2^{12}$–$2^{17}$ bits of the 48-bit multiplier, which, at present, are stored in the $2^6$–$2^{11}$ stages of the $A_2$ register.

Returning to the first example discussed above, the least significant 6 bits of the multiplier correspond to the number $18_{10}$. The decoder 35 produces the levels A72 and A14 in response to these 6 bits. The A72 level primes AND gates 30b and this causes the 7 multiple of the multiplicand to appear on bus ABB shifted one place to the left. Accordingly, the word on ABB is the $14_{10}$ multiple of the multiplicand. In a similar manner, the word appearing on the ABA bus, which is shifted 2 places to the left with respect to the word in the M1 register, is the 4 multiple of the multiplicand.

The adder 1 adds the word on bus ABA to the word on bus ABF (the latter is 0) to produce the 4 multiple of the multiplicand on bus ABD. The adder 2 adds the $14_{10}$ multiple appearing on bus ABB to the 4 multiple appearing on bus ABD to produce the $18_{10}$ multiple on bus ABE.

By the time the two adders have operated, as above, the $2^6$–$2^{47}$ bits of the Q register have been transferred to the $A_2$ register. And the level RQ has been applied to the Q register to reset all stages of the Q register. At this point, the level GQ is generated and the least significant 42 bits of the word stored in the $A_2$ register are applied to the Q register right justified. The 6 least significant bits of this word are the next partial multiplier. These bits are now in the $2^0$–$2^5$ stages of register Q. The most significant 6 stages of the Q register are now temporarily empty.

The $A_1$ register is now reset by applying the reset level RA1. In the present instance, the word previously stored in the $A_1$ register was a 0 so that the reset level is not necessary. However, in the general case, the $A_1$ register will be storing a word and is reset prior to the time that the adder 2 output word on bus ABE is applied to the $A_1$ register.

The level GA1 is now generated and the 18 multiple appearing on bus ABE passes through AND gates 61 and 62 to the $A_1$ register and the last six stages (the $2^{42}$–$2^{47}$ stages) of the $A_2$ register. The $2^{42}$–$2^{47}$ stages store the least significant 6 bits of the partial product. It might be mentioned here that these are the least significant 6 bits of the final product and will continue to be retained until all of the partial products are accumulated. These 6 bits also pass into the last six stages (the $2^{42}$–$2^{47}$ stages) of the Q register since the level GQ is concurrent with (actually in partial time coincidence with) the GA1 level. Thus, the least significant 6 bits of the product are stored both in the $A_2$ and Q registers.

The above completes one cycle. Many of the steps in the cycle occur concurrently; however, in the following summary, the steps are discussed in logical sequence. The level SQ is generated transferring the multiplier from the main data bus MDB into the Q register. The decoder operates generating the required (A, S and C carry) control levels. The contens of the $A_1$ register are transferred to the X register by generating the level GX1. The level GA2 is generated to transfer the $2^6$–$2^{47}$ bits of the Q register to the $2^0$–$2^{41}$ stages of the $A_2$ register. If a carry C was generated by the decoder, the next partial multiplier (the word stored in the $2^0$–$2^5$ stages of the $A_2$ register) is incremented by one. Or, if there was an overflow as a result of the incrementing of the previous partial multiplier by one, then the next partial multiplier (stored in the $2^0$–$2^5$ stages of the $A_2$ register) is incremented by one. (This is discussed later in connection with FIGURE 5 which shows that this may be accomplished by generating the level GA2 followed by JA2.) The level RQ is generated to reset the Q register and then the level GQ is generated to transfer the contents of the $A_2$ register to the Q register. The $A_1$ register is reset. The level GA1 generated to transfer the output of the three-operand adder (adder 1 and adder 2) to the $A_1$ register, and to the most significant 6 stages in the $A_2$ and Q registers. Thus, the partial product is present in the 54 stages comprising the $A_1$ register and the $2^{42}$–$2^{47}$ stages of the Q register. The next multiplier is stored in the $2^0$–$2^5$ stages of the Q register. The rest of the multiplier bits are stored in the $2^6$–$2^{41}$ stages of the Q register. The least significant 6 multiplier bits (those just employed to obtain the first partial product) are discarded.

It is now necessary to obtain the next partial product, to essentially multiply that product by $100_8$, and then to add the next partial product times $100_8$ to the originally obtained partial product. It should be recalled that all the numbers are in binary octal form. Multiplying a number by $100_8$ is the equivalent of shifting the number 6 places to the left, that is, shifting 2 octal characters to the left. The effect of such a shift is obtained in the present system by shifting the first obtained partial product 6 places to the right. In other words, in the procedure just outlined, the $22_8$ partial product of the multiplicand is stored in the 54 stages beginning with the $2^{42}$ stage of the $A_2$ register. By the time the next number, which is the 54 most significant bits of the sum of the first and second partial products, is obtained, the least significant 6 bits of the first partial product will have been shifted to the $2^{36}$–$2^{41}$ stages of the $A_2$ register, 6 places to the right of their present position. The most significant 48 bits of the first partial product become the least significant 48 bits in the process of transferring the word stored in the $A_1$ register to the X register through gates 18, as discussed below. This is the equivalent of shifting the word 6 places to the right.

Continuing with the obtaining of partial products, assume that the multiplier is $43_8$ $30_8$ $22_8$. The $22_8$ partial product has just been obtained. The algorithm for obtaining the $30_8$ partial product, which is the equivalent of the algorithm for the $24_{10}$ product, is $(28_{10}-4_{10}) \times$ multiplicand. The 6 least significant bits in the Q register at this time correspond to $30_8$. The decoder decodes the 6 bits and produces the levels A74 and S14 and C1.

To start the second cycle, the word stored in the $A_1$ register is transferred into the X register via bus ABC and gate 18. Gate 18 is primed by producing the level GX1. Accordingly, the word stored in the X register comprises the most significant 48 bits of the first partial product. The 6 least significant bits of the partial product, it will be recalled, are in the last six stages (the $2^{42}$–$2^{47}$ stages) of the Q register. The $A_2$ register is then reset by generating the level RA2. Then, the level GA2 is generated causing the most significant 42 bits stored in the Q register to flow into the $2^0$–$2^{41}$ stages of the $A_2$ register. In other words, the 6 least significant bits of the final product are now stored in the $2^{36}$–$2^{41}$ stages of the $A_2$ register. The next multiplier $43_8$ is now stored in the $2^0$–$2^5$ stages of the $A_2$ register.

As in the previous cycle, if C is a 1, the 6 least significant bits ($43_8$) stored in the $A_2$ register are incremented by 1. As mentioned above, these 6 bits comprise the next multiplier word. In this specific example, $30_8$ being processed does not cause C to be a 1, and therefore does not cause $43_8$ to be incremented by 1. The Q register is now reset by generating the level RQ. Next the level GQ is generated to cause the transfer of the 48 bit word from the $A_2$ register through gates 60 to the Q register. At this time, the least significant 6 bits in the Q register are the next multiplier word $43_8$. The $2^{35}$–$2^{41}$ stages of the Q register now store the original least significant 6 bits of the final product. The $2^{42}$–$2^{47}$ stages of the Q register store the bits 000000.

The $A_1$ register is reset by generating the level RA1 during the time the word is being transferred from the $A_2$ register to the Q register. Thereafter the output of the adder 2 is applied to the $A_1$ register and the last 6 stages both of the $A_2$ and Q registers.

Returning for a moment to the method by which the second partial product is obtained, it will be recalled that the most significant 48 bits in the first partial product are stored in the X register. The decoder 35 generates the levels A74 and S14, in response to the multiplier $30_8$. The level A74 primes AND gate 30a and causes the 4 multiple of the 7 multiple, that is, the 28 multiple of the multiplicand, to appear on adder but ABB. The S14 level causes the complement of the 4 multiple of the multiplicand to appear on the ABA bus. The adder 1 adds the complement of the 4 multiple of the multiplicand to the 48 most significant bits of the first partial product (the first partial product having essentially shifted six places to the right). The sum word thereby obtained, which appears on bus ABD, is added to the 28 multiple of the multiplicand appearing on bus ABB, by adder 2. The word appearing on the ABE bus is therefore the most significant 53 bits of the product of $30_8$, $22_8$ times the multiplicand. The least significant 6 bits of this product are already stored in the $2^{36}$–$2^{41}$ stages of the Q register.

When the GA1 level occurs, the word on the ABE bus passes into the $A_1$ register and the last 6 stages of the $A_2$ register, as already discussed. The 6 bits which flow into the $A_2$ register go also to the last 6 stages of the Q register, since the GQ level is still active. Accordingly, the Q register now stores the last 12 bits of the final product in its $2^{36}$–$2^{47}$ stages. The $A_1$ register stores the 48 most significant bits constituting the sum of the first and second partial products.

The process above is continued by repeating the cycles discussed above and illustrated in the timing chart of FIGURE 3 until the final product is obtained. If the last multiplier digit does not have a carry C, the final product is in the $2^0$–$2^{47}$ stages of register $A_1$ and the $2_0$–$2^{47}$ stages of register Q. It is possible that the last mulitplier digit causes a carry C, in which case an additional cycle is executed. This cycle will be executed without RQ and GQ generated so as not to advance the partial product to the right six places. (If the word in the Q register were shifted 6 places to the right, the least significant 6 bits of the final product would be lost.) The word transferred into the X register will still be the $2^0$–$2^{47}$ bits of the $A_1$ register. The multiple selection signal will be A11. The most significant part of the final product will be in the $2^0$–$2^{41}$ stages of the $A_1$ register and the $2^{42}$–$2^{47}$ stages of the $A_2$ register. A control flip-flop (shown in FIGURE 5) can be set in response to a signal from the control area of the computer to remember this fact, that is, which portions of the A register contain the final product. When the most significant part of the product is called for, the proper portions of the $A_1$ and $A_2$ registers are used. For instance, the control flip-flop will dictate whether gates 31*a* or gates 31*b* are to be used for the transfer of the product from the A register to the main memory (not shown).

Figure 5:
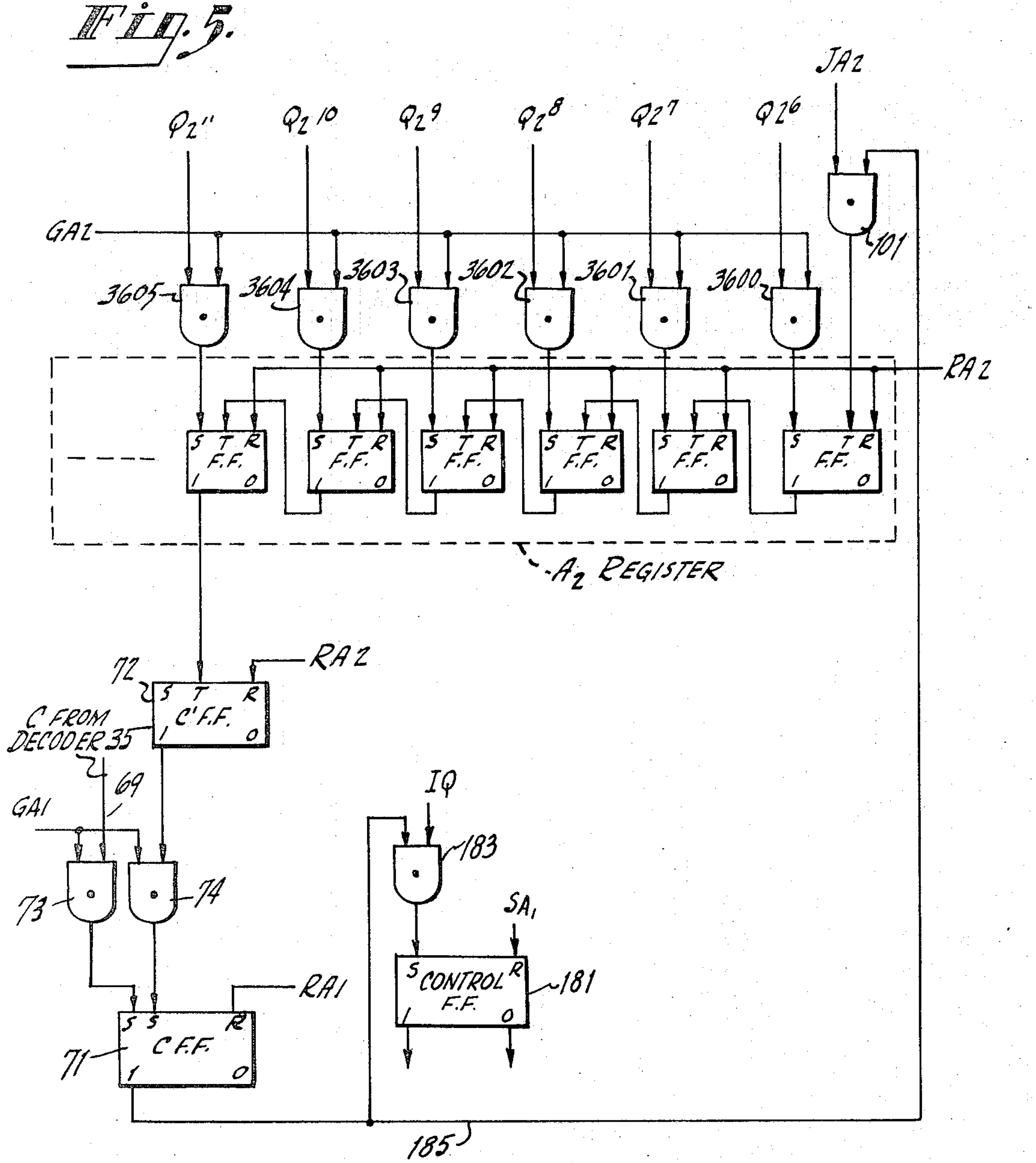
FIGURE 5 is a more detailed block circuit diagram of the $A_2$ register ($2^0$ to $2^5$ stages) and the C and C′ flip-flops.

Referring briefly to FIGURE 5, the control flip-flop above is shown at 181. The input AND gate 183 for this flip-flop is connected at its output to the set terminal S of the flip-flop. The inputs to the flip-flop are IQ, which is normally a 0, from the control area of the computer, and the signal present on lead 185.

When the final partial product is obtained, IQ changes to a 1. If there was final carry, lead 185 also carries a 1, as discussed later in connection with FIGURE 5. Under these conditions, flip-flop 181 becomes set. The 1 appearing at the output terminal of this flip-flop, when the flip-flop is set, causes the gates which generates GQ and RQ to be inhibited, and causes the level $TA_2$ to prime gate 31*b*, and the gate 31*a* is enabled. If, on the other hand, flip-flop 181 remains reset, indicating that a final carry is not present, the 1 appearing at the 0 output terminal causes the level $TA_1$ to prime the gate 31*a*, and gate 31*b* is disabled (since the 1 output terminal of flip-flop 181 produces a 0). Flip-flop 181 may subsequently be reset by the same signal $SA_1$ which is used to transfer the next multiplicand into the $A_1$ register from the main data bus MDB.

With two exceptions, any partial product is obtained in one adder cycle. These exceptions are the partial products for multiples corresponding to $31_{10}$ and $33_{10}$. The former requires the generation of the 2 and 1 multiples of the multiplicand. In the first cycle, the 1 multiple may be generated and added to the partial product without shifting by not generating RQ or GQ. Then, an additional cycle may be used by transferring $A_1 2^0$–$2^{44}$, $A_2 2^{42}$–$2^{47}$ via gate 26 with generation of GX2 instead of GX1, to add the sum of the 28 and 2 multiples to the shifted partial product. The reason two rather than one adder cycles are required is that the gates 24*b* and 24*c* are in the same bank and cannot be operated at the same time. In a similar manner, it is not possible to generate the 33 multiple in one cycle because the gates 24*e* and 24*f*, which produce the complements of the 2 and 1 multiples of the multiplicand, respectively, are in the same bank.

Figure 7:
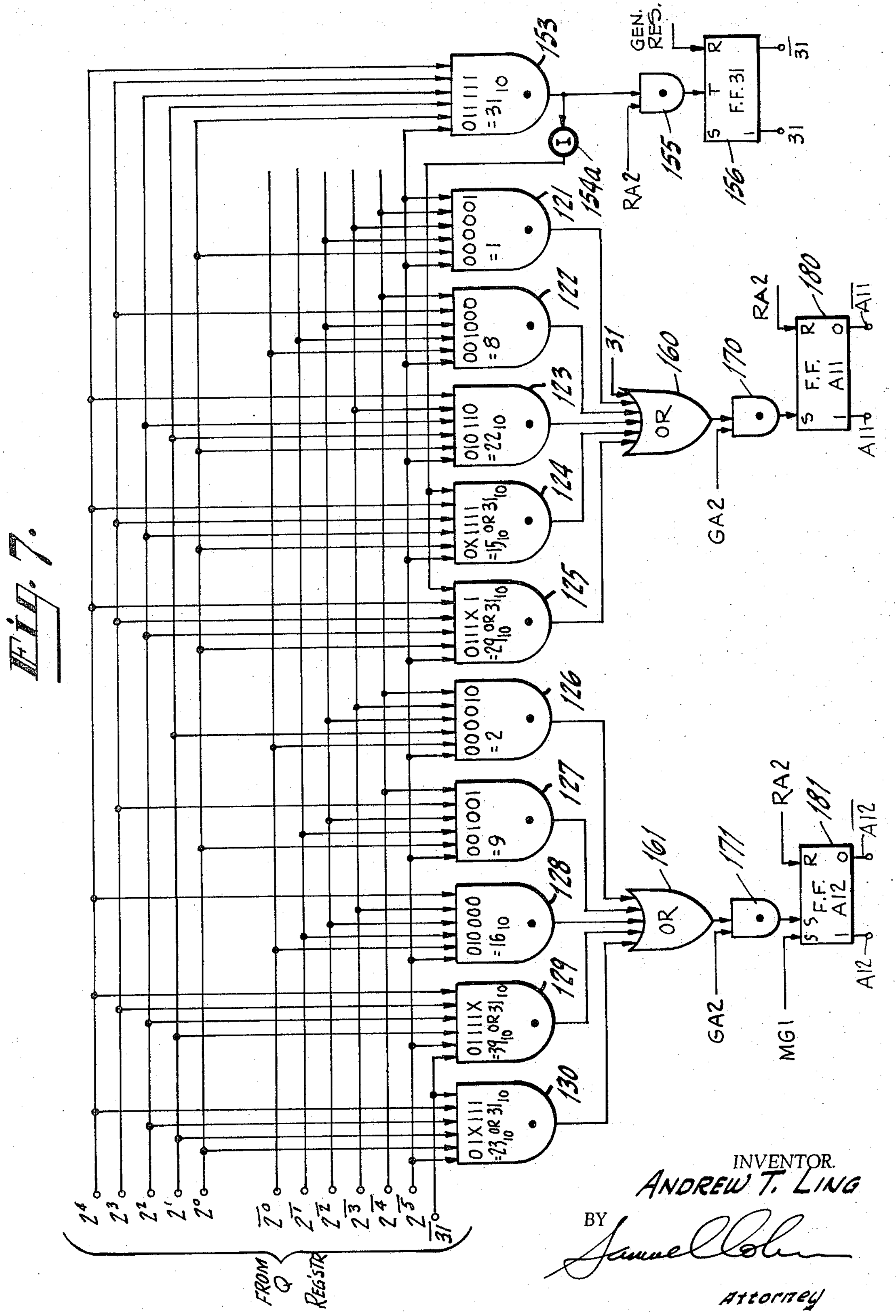
FIGURE 7 is a more detailed block circuit diagram of a portion of the decoder of FIGURE 1.

Since the system of the present invention may be asynchronous, the fact that two of the partial products require two cycles rather than one is of no concern except for the fact that it slightly decreases the average operating speed of the multiplier. The appropriate control levels for causing the 31 and 33 multiples to be obtained in two rather than one cycle are produced by the decoder 35 in a manner similar to that employed to obtain the other products. FIGURE 7, which shows a small part of the decoder 35 of FIGURE 1, illustrates the operation of the decoder in response to the $31_{10}$ multiple.

The circuit of FIGURE 7 include 11 decoder AND gates 121–130 and 153. These receive different permutations of the outputs of the $2^0$–$2^5$ stages of the Q register. AND gate 153 is connected through an AND gate 155 to the trigger terminal of a triggerable flip-flop 156. The output of AND gate 153 is also connected through an inverter 154*a* to AND gates 124 and 125. AND gates 126–130, inclusive, are connected through an OR gate 161 and AND gate 171 to the set terminal of flip-flop 181. AND gates 121–125 are connected through OR gate 160 and AND gate 170 to the set terminal of flip-flop 180.

The various AND gates in FIGURE 7 are all identified by a binary code and its equivalent decimal number. For example, when $\overline{31}$ is a 1, AND gate 130 produces a 1 output in repsonse to the input 010111 ($23_{10}$) or 011111 ($31_{10}$). Legends applied to the various flip-flops indicate the control levels they produce. Thus, when flip-flop 181 is set, it produces the control level A12=1; when flip-flop 180 is set, it produces the control level A11=1; and when the flip-flop 156 is set, it produces the control level 31=1. The A12 and A11 levels are employed to control certain of the AND gates in FIGURE 1, as indicated in Table I. The 31 control level is employed to control certain of the AND gates in FIGURE 7.

In the operation of the system of FIGURE 7, if the multiplier in the Q register is 000010, for example, AND gate 126 is enabled. This causes OR gate 161 to be enabled and, when the level GA2 occurs, AND gate 171 becomes enabled causing flip-flop 181 to be set. The flip-flop thereupon generates the level A12=1. As may be observed from Table I, this conforms to the operation requird. A similar analysis can be made for other of the AND gates.

As indicated above, in the event that the multiplier is $31_{10}$, two cycles, rather than one, are required to obtain a partial product. The multiplier $31_{10}$ is recognized by gates 129, 130, 124, 125 and 153. However, during the first cycle, the inverter 154*a* inhibits AND gates 124 and 125, preventing the latter from producing an output. When the signal RA2 occurs during the first cycle, AND gate 155 triggers flip-flop 156 to the set condition. This changes the $\overline{31}$ output to 0. $\overline{31}$ is applied as an inhibit signal to AND gates 129 and 130, preventing them from producing an output. The signal 31=1, produced during the first cycle, is applied to OR gate 160 and, when the level GA2 occurs, AND gate 170 becomes enabled, setting flip-flop 180. The A11=1 output is produced, as is required in the first of the two multiple generation cycles.

The $\overline{31}$=0 output of the flip-flop 156 is also applied to a circuit (not shown) for preventing the signals GQ and RQ (FIGURE 3) from being generated in order to prevent the partial product and the multiplier digits from being advanced. Also during the first of the two cycles, the decoder AND gate which initiates the control level A74 (not shown in FIGURE 7) is inhibited by the signal $\overline{31}=0$, just as gates 129 and 130, shown in FIGURE 7.

During the second cycle, since the multiplier $31_{10}$ is still in the first six stages of the Q register, the decoder AND gate 153 again produces a 1 output. This again inhibits AND gates 124 and 125. Normally, during the partial product add cycles, GX1 is always generated when flip-flop 31 is reset. However, at present, flip-flop 31 is still set, and GX2 is generated instead of GX1 by the logic circuits in the control area of the system. Therefore, the word transferred into the X register is $A_1 2^0$–$2^{42}$ and $A_2 2^{42}$–$2^{47}$ via gate 26.

When the signal RA2 occurs, AND gate 155 again becomes enabled triggering flip-flop 156 to the reset condition. The level 31 changes to 0 so that OR gate 160 does not produce an output. On the other hand, AND gates 129 and 130 do both produce an output. The latter outputs enable OR gate 161 and, when the signal GA2 occurs, AND gate 171 becomes enabled and sets flip-flop 181. This causes the generation of the required A12 control level. In a similar manner, the decoder AND gate (not shown) which is responsible for the actuation of the flip-flop (not shown) for generating the A74 level is also actuated during the second cycle. Further, since flip-flop 31 is reset, the control level RQ and SQ are generated normally and the partial product and multiplier are advanced accordingly in preparation to process the next multiplier digits.

Summarizing the operation above, when the multiple is $31_{10}$, the partial product is obtained in two cycles, rather than one. During the first cycle, the control level A11 is generated and the one multiple of the multiplicand is added to the previous partial product without shifting. In the second cycle, the control levels A12 and A74 are generated. This causes the 2 multiple of the multiplicand, the 28 multiple of the multiplicand and the just-obtained unshifted partial product to be added, with appropriate shifting.

Figure 4:
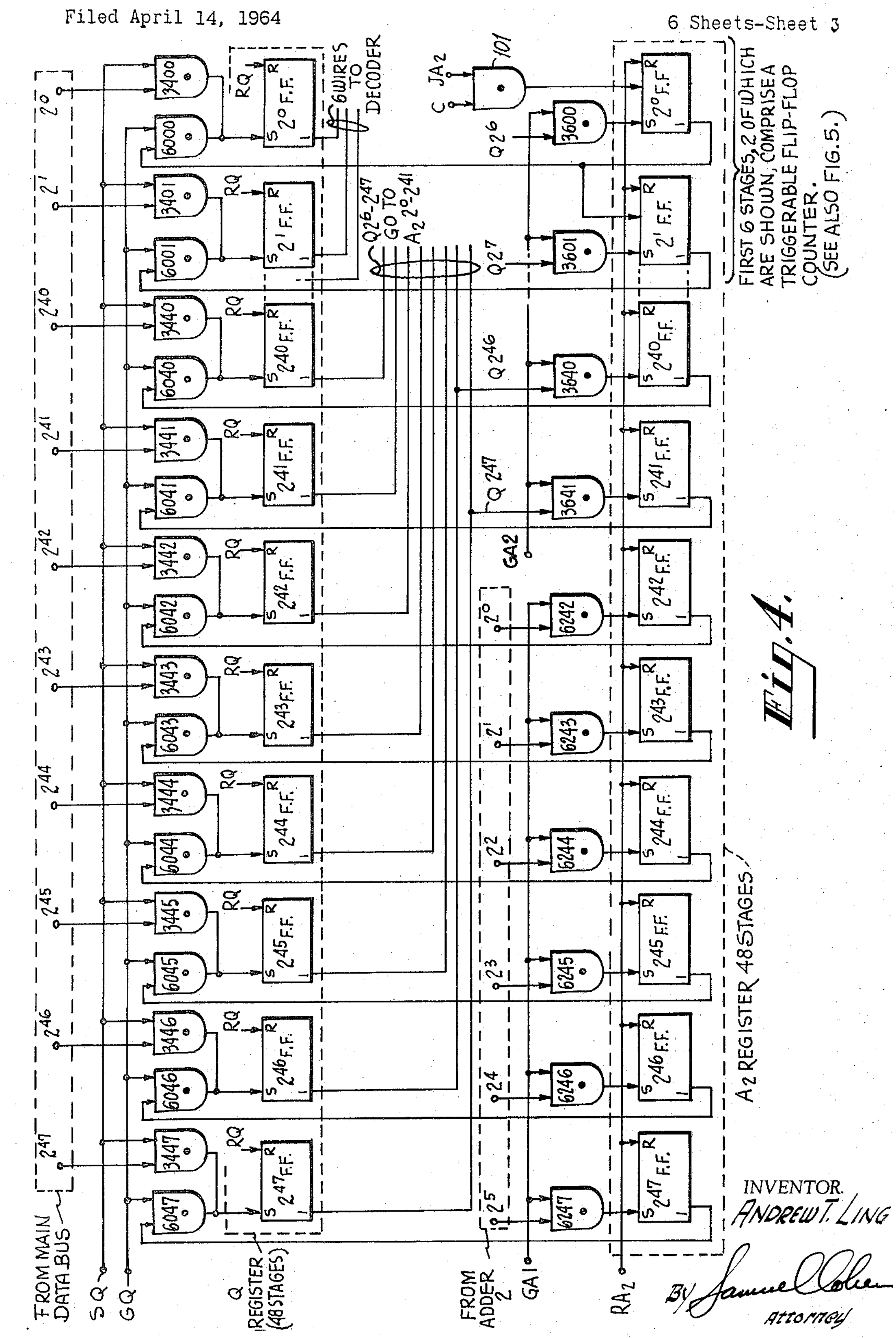
FIGURE 4 is a more detailed block circuit diagram of portions of certain Q and $A_2$ registers of FIGURE 1 and the input gates to these registers.
Figure 6:
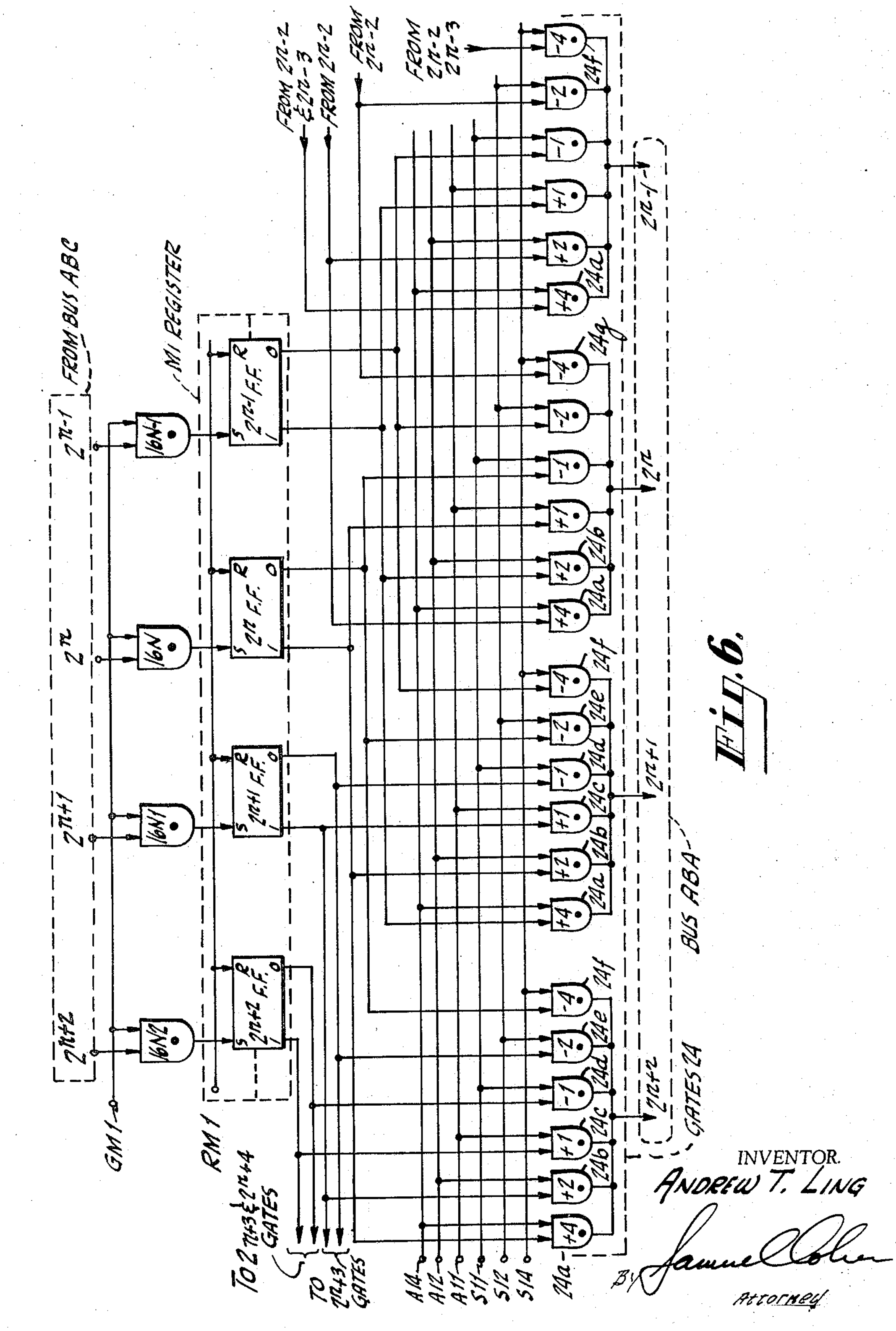
FIGURE 6 is a more detailed showing of a portion of the M1 register of FIGURE 1 and the output gates of the register.

FIGURES 4–6 show additional details of the system of FIGURE 1. FIGURE 4, for example, shows a portion of the $A_2$ and Q registers and various gates associated with these registers. Each gate is identified by 4 numbers, the first 2 of which correspond to the numbers identifying the gates of FIGURE 1. For example, the gates 6247, 6246 and so on correspond to the single block legended 62 in FIGURE 1. The gates 3600, 3601 and so on correspond to the gates 36 of FIGURE 1.

In the operation of the system of FIGURE 1, when the level SQ is generated, the word from the main data bus is transferred through the gates 3400 . . . 3447 to the 48 flip-flops making up the Q register. The 1 output level of each flip-flop, from $2^6$ to $2^{47}$ flip-flop, is connected to the input gate for the flip-flop 6 positions to the right in the $A_2$ register. For example, the 1 output of the $2^{46}$ flip-flop of the Q register is connected to the input gate 3640 for the $2^{40}$ flip-flop of the $A_2$ register. The $2^0$–$2^5$ stages of the Q register are connected to the decoder 35 shown in FIGURE 1.

The flip-flops of the $A_2$ register are all connected back through gates to the corresponding flip-flops of the Q register. Thus, when the level GQ is generated, the 48-bit word stored in the $A_2$ register is transferred through the gates 6047 . . . 6000 to the Q register.

When the level GA2 is generated, the $2^6$–$2^{47}$ bits stored in the Q register are transferred into the $2^0$–$2^{41}$ stages of the $A_2$ register through gates 3600–2641.

The gates 6242–6247 control the transfer of the 6 least significant bits from adder 2 to the $2^{42}$–$2^{47}$ stages of the $A_2$ register. These gates are primed by the level GA1.

As previously mentioned, the first 6 stages of the $A_2$ register comprise a triggerable flip-flop counter. This is shown in more detail in FIGURE 5. Once each adder cycle, the level JA2 is generated and applied as a priming signal for AND gate 101. If the carry C signal is present, due to the setting of C flip-flop 71, the AND gate 101 produces an output signal which is applied to the trigger terminal of the $2^0$ flip-flop. The effect is to increment by one the 6-bit word stored in the $2^0$–$2^5$ stages.

FIGURE 5 also shows that when the first six stages of the $A_2$ register overflow, that is, when the multiplier is 111111 and a carry C is added, then C′ flip-flop 72 becomes set. The next time the level GA1 occurs, if the C′ flip-flop is set, AND gate 74 becomes enabled. On the other hand, if a carry C is present from the decoder 35, then AND gate 73 becomes enabled. If either of these AND gates is enabled, the C flip-flop 71 becomes set. When flip-flop 71 is set, the 6-stage triggerable flip-flop is incremented by one, in response to the level JA2, the next time a multiplier is placed therein.

Details of a portion of one of the M registers and the gates which act as a shift network for the register, appear in FIGURE 6. The M1 register is the one illustrated; however, the M7 and M21 registers operate in exactly the same way. Each of the gates 24 shown in FIGURE 1 actually comprise 6 gates. In FIGURE 6, each such gate is legended with a number such as +2, +4 and so on to indicate the amount by which the gate essentially multiplies the number it receives. As an example, when the level A14 is applied to the gates legended +4, they shift the bit they receive 2 places to the left. A shift of 2 places to the left is equivalent to multiplication by 4.

As can be seen in the figure, the 1 output of the $2^{n-1}$ flip-flop is supplied to the +4 gate 24*a* beneath the $2^{n+1}$ flip-flop. Thus, when the level A14 is applied, the $2^{n-1}$ bit stored in the M1 register appears on the $2^{n+1}$ line of the ABA bus, that is, shifted 2 places to the left. In a similar manner, a level such as S12 shifts the complement of a bit 1 place to the left. As an example, the 0 output terminal of the $2^n$ flip-flop connects to the −2 gate beneath the $2^{n+1}$ flip-flop. Therefore, when the level S12 is applied, the complement of the $2^n$ bit appears on the $2^{n+1}$ wire of bus ABA.

What is claimed is:

1. A system for obtaining the product of two binary octal coded numbers, one the multiplicand and the other the multiplier, comprising, in combination:

(a) means for obtaining and storing the 1, 7 and $25_8$ multiples and the complements of these multiples of the multiplicand;

(b) means for shifting said multiples and said complements;

(c) means responsive to the two last significant octal characters of the multiplier for selectively adding the stored multiples and the complements of the multiplies of the multiplicand, and shifted stored multiples and the shifted complements of the stored multiples of the multiplicand, to obtain the partial product of said two octal multiplier characters and the multiplicand;

(d) means for adding the partial product obtained by the means of (c) above with any previously obtained partial products, when the latter are present;

(e) means for removing the two least significant octal multiplier characters and for shifting the next two octal multiplier characters to the position of the two least significant multiplier characters; and (f) means coupled to the means (c), (d) and (e) above for causing them to continue to operate until the final product is obtained.

2. A system for obtaining the product of binary octal coded multiplicand and multiplier numbers comprising, in combination:

(a) means for shifting the multiplicand one place to the left to obtain the 2 multiple thereof, two places to the left to obtain the 4 multiple thereof, and for adding the multiplicand and its 2 and 4 multiples to obtain the 7 multiple of the multiplicand;

(b) means for shifting the 7 multiple of the multiplicand one place to the left to obtain the $16_8$ multiple of the multiplicand and for adding the 7 and $16_8$ multiples to obtain the $25_8$ multiple of the multiplicand;

(c) three registers for storing the 1, 7 and $25_8$ multiples of the multiplicand, respectively and for producing and storing the complements of the 1, 7 and $25_8$ multiples of the multiplicand;

(d) means responsive to the two least significant octal characters of the multiplier for selectively adding the stored multiples and the complements of the stored multiples of the multiplicand, and the shifted stored multiples and shifted complements of the stored multiples of the multiplicand, to obtain the partial product of said two octal multiplier characters and the multiplicand;

(e) means for adding the partial product obtained by the means of (d) above with any previously obtained partial products, when the latter are present;

(f) means for removing the two least significant octal multiplier characters and for shifting the next two octal multiplier characters to the position of the two least significant multiplier characters; and (g) means coupled to the means (d), (e) and (f) above for causing them to continue to operate until the final product is obtained.

3. A system for obtaining the product of a binary octal coded multiplicand and a binary octal coded multiplier comprising, in combination:

(a) means for obtaining and storing the 1, 7 and $25_8$ multiples and the complements of the 1, 7 and $25_8$ multiples of the multiplicand;

(b) means responsive to the least significant six bits of the multiplier for obtaining and selectively choosing the one, two and four multiples of the stored multiples and the complements of the stored multiples of the multiplicand for addition to obtain the partial product of said least significant six bits of the multiplier, and the multiplicand;

(c) means for adding the partial product obtained by the means of (b) above with any previously obtained partial products when the latter are present;

(d) means for removing the least significant six bits of the multiplier and for shifting the next six multiplier bits to the position of the least significant six bits of the multiplier; and (e) means coupled to the means (b), (c) and (d) above for causing them to continue to operate until the final product is obtained.

References Cited by the Examiner

UNITED STATES PATENTS

| | | | |
|---|---|---|---|
| 2,834,543 | 5/1958 | Burkhart ------------ | 235—159 |
| 3,069,085 | 12/1962 | Coopper et al. ------- | 235—164 |
| 3,123,707 | 3/1964 | Kilburn et al. ------ | 235—164 |
| 3,192,366 | 6/1965 | Cochran et al. ------ | 235—164 |

OTHER REFERENCES

Blaauw et al.: Binary Multiplication IBM Technical Disclosure Bulletin, vol. 4, No. 11, April 1962.

MALCOLM A. MORRISON, *Primary Examiner.*

ROBERT C. BAILEY, *Examiner.*

M. P. HARTMAN *Assistant Examiner.*